United States Patent
Vanous et al.

(10) Patent No.: US 10,913,325 B2
(45) Date of Patent: Feb. 9, 2021

(54) METHODS AND SYSTEMS FOR DETERMINING UNIT SHUTDOWN BASED ON SYSTEM OPERATIONAL PARAMETERS

(71) Applicant: THERMO KING CORPORATION, Minneapolis, MN (US)

(72) Inventors: Michael James Vanous, Minneapolis, MN (US); Bartley Theis, Montrose, MN (US); Srinivasa Rao Koppineedi, Karnataka (IN); Vijaya Kumar K S, Tamilnadu (IN)

(73) Assignee: Thermo King Corporation, Minneapolis, MN (US)

( * ) Notice: Subject to any disclaimer, the term of this patent is extended or adjusted under 35 U.S.C. 154(b) by 464 days.

(21) Appl. No.: 15/796,178

(22) Filed: Oct. 27, 2017

(65) Prior Publication Data

US 2019/0092122 A1  Mar. 28, 2019

(30) Foreign Application Priority Data

Sep. 22, 2017 (IN) .............................. 201741033766

(51) Int. Cl.
*B60H 1/00* (2006.01)
*B60P 3/20* (2006.01)

(52) U.S. Cl.
CPC ............ *B60H 1/00428* (2013.01); *B60P 3/20* (2013.01)

(58) Field of Classification Search
None
See application file for complete search history.

(56) References Cited

U.S. PATENT DOCUMENTS

| | | |
|---|---|---|
| 4,902,956 A | 2/1990 | Sloan |
| 6,038,877 A | 3/2000 | Peiffer |
| 6,276,161 B1 | 8/2001 | Peiffer et al. |
| 6,457,324 B2 | 10/2002 | Zeigler et al. |
| 6,681,588 B2 | 1/2004 | Zeigler |
| 6,889,762 B2 | 5/2005 | Zeigler et al. |
| 7,448,227 B2 | 11/2008 | Zeigler et al. |
| 7,454,922 B2 | 11/2008 | Zeigler et al. |
| 7,591,143 B2 | 9/2009 | Zeigler et al. |
| 7,591,303 B2 | 9/2009 | Zeigler et al. |
| 8,141,377 B2 | 3/2012 | Connell et al. |
| 8,453,722 B2 | 6/2013 | Zeigler et al. |
| 8,517,087 B2 | 8/2013 | Zeigler et al. |
| 9,307,495 B2 | 4/2016 | Valentine |
| 9,352,635 B1 * | 5/2016 | Schepmann ....... B60H 1/00392 |

(Continued)

FOREIGN PATENT DOCUMENTS

EP 2944506 11/2015

*Primary Examiner* — Kelly D Williams
(74) *Attorney, Agent, or Firm* — Hamre, Schumann, Mueller & Larson, P.C.

(57) ABSTRACT

A battery-powered power unit is provided in which a state of charge parameter is used to determine whether to shut off the battery-powered power unit, and an adjustment parameter is used to determine when to shut off the battery-powered power unit closer to a predetermined state of charge value for the battery. The state of charge parameter may be voltage across the battery, and the adjustment parameter may be current leaving the battery-powered power unit. The parameters may be values that are internal to the battery-powered power unit. The battery-powered power unit can be used in, for example, tractor auxiliary power units.

17 Claims, 4 Drawing Sheets

(56) References Cited

U.S. PATENT DOCUMENTS

2013/0020046 A1\* 1/2013 Momose ............ B60H 1/00428
                                               165/11.1
2018/0090962 A1\* 3/2018 Cha .................... G01R 31/3648

\* cited by examiner

METHODS AND SYSTEMS FOR DETERMINING UNIT SHUTDOWN BASED ON SYSTEM OPERATIONAL PARAMETERS

FIELD

This disclosure relates to battery-powered power units. In particular, the embodiments described herein relate to methods and systems for determining unit shutdown of a battery-powered power unit based on system operational parameters.

BACKGROUND

For certain applications of battery-powered power units, it is desirable to reserve a certain amount of charge in the battery-powered power unit. This can be to prolong the life of the battery, or to ensure sufficient power for critical operations. Examples of such critical operations include starting a vehicle including the battery-powered power unit. Currently, this amount of reserve charge is estimated based on a parameter such as the voltage across the battery. However, the voltage across the battery varies not only with state of charge, but also with load. Accordingly, differences in load can produce inaccuracies in estimations of the state of charge of a battery.

BRIEF SUMMARY

This disclosure relates to battery-powered power units. In particular, the embodiments described herein relate to methods and systems for determining unit shutdown of a battery-powered power unit based on system operational parameters.

In particular, the embodiments described herein can determine a power cutoff of the battery-powered power unit using a correction value based on an adjustment parameter so that power is cut off at a state of charge that more closely matches a target state of charge value. This reduces excessive battery drain when the load on the battery-powered power unit is low, and reduces premature cut off when the load on the battery-powered power unit is high.

Embodiments herein include methods of determining when to cut off power from a battery-powered power unit based on a state of charge parameter, an adjustment parameter, and a threshold value. System embodiments include battery-powered power systems that cut off power based on a state of charge parameter, an adjustment parameter and a threshold value. Embodiments of the method and system allow the battery-powered power unit to more accurately cut off power at a target state of charge value regardless of factors affecting the relationship between the state of charge parameter and the actual state of charge of a battery of the battery-powered power unit. This improved accuracy allows better protection of battery life, ensures the ability to perform critical operations, and provides superior runtime for the battery-powered power unit.

This is particularly advantageous in situations where loads can vary greatly, which is a source of significant error for prior cut off methods that rely on a set voltage threshold. For example, in a context where loads can vary from less than 5 amps to over 100 amps, voltage threshold measurements attempting to reserve a 40% state of charge for a battery can result in a 10% state of charge when the voltage threshold is reached at a low load, and an 80% state of charge when the voltage threshold is reached at a high load. Over the same range of loads, embodiments according to this disclosure can remain within +/−5% of the targeted state of charge. Embodiments herein may not require data or measurements external to the battery-powered power unit, allowing battery-powered power units to be usable with a range of power consuming products, including, for example, vehicle engines, vehicle HVACR units, transport refrigeration units, tractor cabin hotel loads, and other devices powered by battery-powered power units.

A method embodiment includes obtaining a state of charge parameter correlated with a state of charge of a battery of the battery-powered power unit and obtaining an adjustment parameter affecting a relationship between the state of charge parameter and the state of charge of the battery of the battery-powered power unit. The method embodiment further includes determining whether the state of charge of the battery is at or below a target state of charge value, based on the state of charge parameter, the adjustment parameter, and a threshold value. When the state of charge of the battery is at or below the target state of charge value, the method includes cutting off a supply of power from the battery-powered power unit. The cut off of power may be, for example, a physical switch disconnecting the load, or sending a signal to a load to deactivate that load. The cut off of power may be a cut off to a specific load and not all devices powered by the battery-powered power unit, for example disconnecting or deactivating a primary function of a system such as an HVACR unit or a transport refrigeration unit, while still powering other loads, for example a controller.

In an embodiment, the state of charge parameter includes voltage across the battery and the adjustment parameter includes current flow out of the power source. In an embodiment, determining whether the state of charge of the battery is at or below a target state of charge value comprises determining whether an adjustment is needed to the threshold value, and when the adjustment is needed, determining a correction value. In an embodiment, determining a correction value is based on a moving average of values for the adjustment parameter. In an embodiment, determining whether the state of charge of the battery is at or below a target state of charge value further comprises modifying the threshold value according to the correction value and comparing the state of charge parameter to the modified threshold value. In an embodiment, determining whether the state of charge of the battery is at or below a target state of charge value further comprises modifying the state of charge parameter according to the correction value and comparing the modified state of charge parameter to a threshold value.

A battery-powered power unit embodiment includes a battery, a state of charge parameter sensor, an adjustment parameter sensor, and a controller. The controller obtains a state of charge parameter correlated with a state of charge of a battery of the battery-powered power unit, obtains an adjustment parameter affecting a relationship between the state of charge parameter and the state of charge of the battery of the battery-powered power unit, and determines whether the state of charge of the battery is at or below a target state of charge value, based on the state of charge parameter, the adjustment parameter, and a threshold value. When the state of charge of the battery is at or below the target state of charge value, a supply of power from the battery-powered power unit is cut off. In an embodiment., the state of charge parameter sensor includes a voltage sensor and wherein the adjustment parameter sensor includes a current sensor. In an embodiment, the system includes a memory configured to store previous readings from the adjustment parameter sensor. In an embodiment, the controller determines whether the state of charge of the battery is at or below a target state of charge value using a moving average of readings from the adjustment parameter sensor. In an embodiment, the controller determines whether the state of charge of the battery is at or below a target state of charge value by determining a correction value and modifying one of the threshold value or the state of charge parameter according to the correction value.

A battery-powered system embodiment includes a battery-powered power unit, including: a battery, a state of charge parameter sensor, an adjustment parameter sensor, and a controller. The controller obtains a state of charge parameter correlated with a state of charge of a battery of the battery-powered power unit, obtains an adjustment parameter affecting a relationship between the state of charge parameter and the state of charge of the battery of the battery-powered power unit, and determines whether the state of charge of the battery is at or below a target state of charge value, based on the state of charge parameter, the adjustment parameter, and a threshold value. When the state of charge of the battery is at or below the target state of charge value, a supply of power from the battery-powered power unit is cut off. The battery-powered system embodiment also includes a load receiving power from the battery-powered power unit. In an embodiment, the load is an HVACR unit. In an embodiment, the load is a transport refrigeration unit. In an embodiment, the state of charge parameter sensor includes a voltage sensor and wherein the adjustment parameter sensor includes a current sensor. In an embodiment, the controller determines whether the state of charge of the battery is at or below a target state of charge value by determining a correction value and modifying one of the threshold value or the state of charge parameter according to the correction value.

DETAILED DESCRIPTION

This disclosure relates to battery-powered power units. In particular, the embodiments described herein relate to methods and systems for determining unit shutdown of a battery-powered power unit based on system operational parameters.

In particular, the embodiments described herein can determine a power cutoff of the battery-powered power unit using a correction value based on an adjustment parameter so that power is cut off at a state of charge closer to a target state of charge value.

Figure 1:
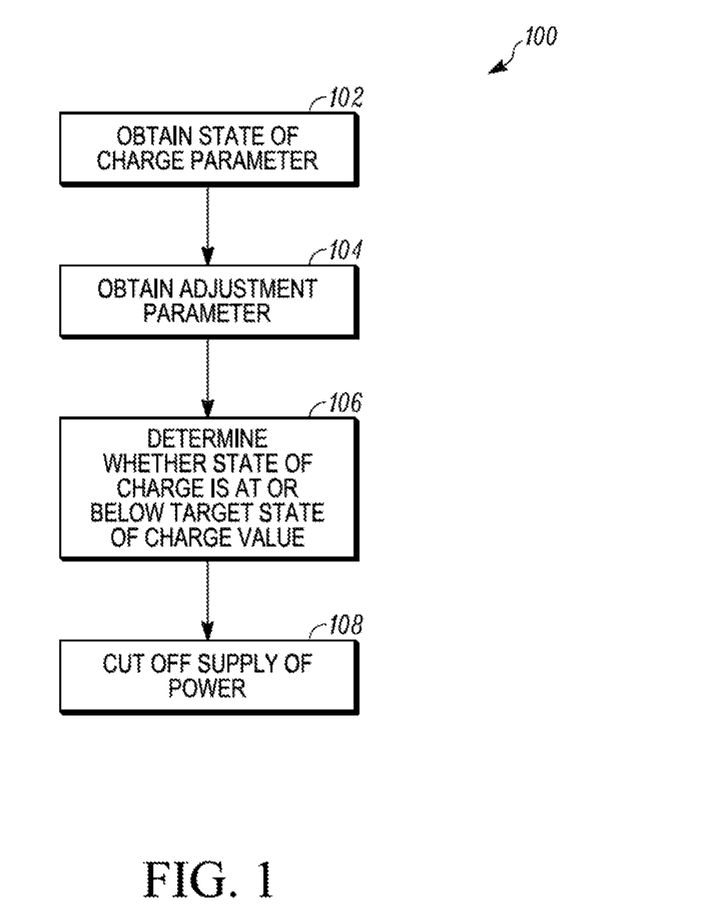
FIG. 1 is a flowchart showing an embodiment of a method for dynamically determining cut off for a battery-powered power unit.

FIG. 1 is a flowchart of a method for dynamically determining cut off for a battery-powered power unit. In method 100, a state of charge parameter is obtained 102. An adjustment parameter is obtained 104. It is determined whether the battery is at or below a target state of charge value 106, and when the battery is determined to be at or below a target state of charge value, the supply of power from the battery-powered power unit is cut off 108.

A state of charge parameter is obtained at 102. The state of charge parameter is a parameter that is correlated with the state of charge of a battery. The state of charge parameter may be, for example, the voltage across the battery. The state of charge parameter may be detected by one or more sensors that provide the state of charge parameter to a controller. The state of charge parameter may be, for example a power measurement obtained through a load test.

An adjustment parameter is obtained at 104. The adjustment parameter is a parameter that affects the relationship between the state of charge parameter obtained in 102 and the actual state of charge of the battery. The adjustment parameter may be, for example, a load on the battery-powered power unit, for example measured as a current leaving the battery-powered power unit. The adjustment parameter may be obtained via one or more sensors that provide the adjustment parameter to a controller. Multiple adjustment parameters may be obtained, for example a temperature of the battery as well as a current being provided by the battery-powered power unit. Adjustment parameters may also include values of parameters of the ambient conditions of the battery-powered power unit such as humidity, ambient temperature, etc. The adjustment parameter may be, for example, the resistance through the battery.

In an embodiment, the state of charge parameter obtained at 102 and the adjustment parameter obtained at 104 are measurements taken entirely within the battery-powered power unit, without regard for, for example, loads receiving power from the battery-powered power unit. The sensors obtaining the state of charge parameter 102 and obtaining the adjustment parameter 104 may be contained within and communicating directly with a local controller.

In an embodiment, data from sensors or devices outside the battery-powered power unit are provided to a controller and are also used to determine cut off for a battery powered battery-powered power unit. In an embodiment., the data from devices outside the battery-powered power unit is an operational state of a load powered by the battery-powered power unit, for example whether a heating, ventilation, air conditioning and refrigeration (HVACR) unit is in a COOL mode providing cool air, a FAN ONLY mode providing ventilation, a HEAT mode providing heating or a NULL mode where the unit is not active. Modes of HVACR units may include HEAT, DEFROST and other functions.

It is determined whether the state of charge of the battery is less than a target state of charge value at 106. This determination may be based on a comparison of the state of charge parameter to a threshold value. The state of charge parameter and/or the threshold value may be adjusted by a correction value, based on the adjustment parameter. The correction value may be determined, or the need for a correction value may first be determined. Where a correction value is not needed, the state of charge parameter and the threshold value may be compared without an adjustment of either value. A correction value may be determined and applied to at least one of the state of charge parameter or the threshold value. This may improve the relationship between the state of charge parameter used to cut off power and the actual state of charge of the battery.

The target state of charge value is the state of charge of the battery at which it is desired to shut the battery off to reserve the remaining power in the battery. The target state of charge value may be a predetermined value based on the characteristics of the battery, such as the impact of discharge on battery life. The target state of charge value may be based on, at least in part, the requirements of the application in which the battery-powered power unit is used, such as loads to be placed on the battery-powered power unit. In an embodiment, the target state of charge is based in part on the amount of power used to start a tractor engine in an auxiliary power unit (APU) of a tractor.

The threshold value may be a value corresponding to a value of the state of charge parameter that is indicative of the target state of charge value under particular conditions. The threshold value may be a value at which the state of charge parameter corresponds to the target state of charge. For example, where the state of charge parameter is a voltage across the battery, the threshold value is a voltage value corresponding to the voltage across the battery at the target state of charge value for a predetermined load or range of loads. Where the threshold value is a voltage value corresponding to the voltage across the battery at the target state of charge value for a predetermined load, voltage values equal to or lower than this threshold value are indicative of a state of charge of the battery that is at or below the target state of charge value.

Optionally, it may be determined whether a correction value is applied when determining if the state of charge of the battery is at or below a target state of charge value 106. The use of a correction value may be determined based on factors indicative of the relationship between the state of charge parameter and the actual state of charge of the battery. A correction value may, for example, be determined when there is a certain level of deviation between the state of charge parameter and the actual state of charge of the battery. Determination of whether a correction value is determined may be based on, for example, the adjustment parameter meeting or exceeding a particular adjustment threshold. In an embodiment, data from outside the battery-powered power unit is used to determine whether a correction value is applied to the threshold value. In an embodiment, the data from outside the battery-powered power unit used to determine whether to apply a correction value is the operational state of an HVACR unit. In an embodiment, a correction value is applied in a COOL or a FAN ONLY mode, and no correction value is applied in other modes of operation for the HVACR unit.

A correction value is determined, based at least in part on the adjustment parameter. The correction value may be determined, for example, based on inputting at least the adjustment parameter into a physical model of the battery, a database of correction values based at least in part on the adjustment parameter, such as a lookup table of correction values by adjustment parameter, etc. In an embodiment, the determination of the correction value is based on a moving average of the adjustment parameter. For example, the average of a predetermined number of the most recent readings of the adjustment parameter may be used to determine the adjustment parameter. The correction value may be used to adjust either the threshold value or the state of charge parameter prior to a comparison of the threshold value and the state of charge parameter. In an embodiment, multiple different adjustment parameters are used to determine the correction value. In an embodiment, state of charge determinations, current measurements, voltage measurements, etc. from prior iterations may be used to determine the correction value.

When the state of charge of the battery is determined to be less than the target state of charge value, the supply of power from the battery-powered power unit is cut off 108. The power from the battery-powered power unit may be cut off 108 using, for example, a switch controlled by a controller determining whether the state of charge of the battery is less than a target state of charge value. Cut off 108 may be a disabling of a primary system function without physically disconnecting the power supply and the load, for example by sending a command from a controller to that primary system such as an HVACR unit, a transport refrigeration unit, etc. Cut off 108 may be specific to one or more loads on the battery-powered power unit, without, for example, stopping power to a controller, monitoring sensors, etc. Cut off 108 may be a reduction in the power directed to one or more loads on the battery-powered power unit, for example sending a command from a controller to a system powered by the battery powered power unit, the command directing that load to operate in a low-power mode. The low-power mode may be for example, a sleep mode, a hibernate mode, a standby mode, etc.

The method 100 shown in FIG. 1 may be iterated in order to dynamically determine whether to cut off the power from the battery-powered power unit as the battery is drained providing power to the load. The iteration of the method may be continuous, may occur according to a predefined schedule or sampling frequency, or may be responsive to outside triggers such as the changing of an operational state of a load.

Figure 2:
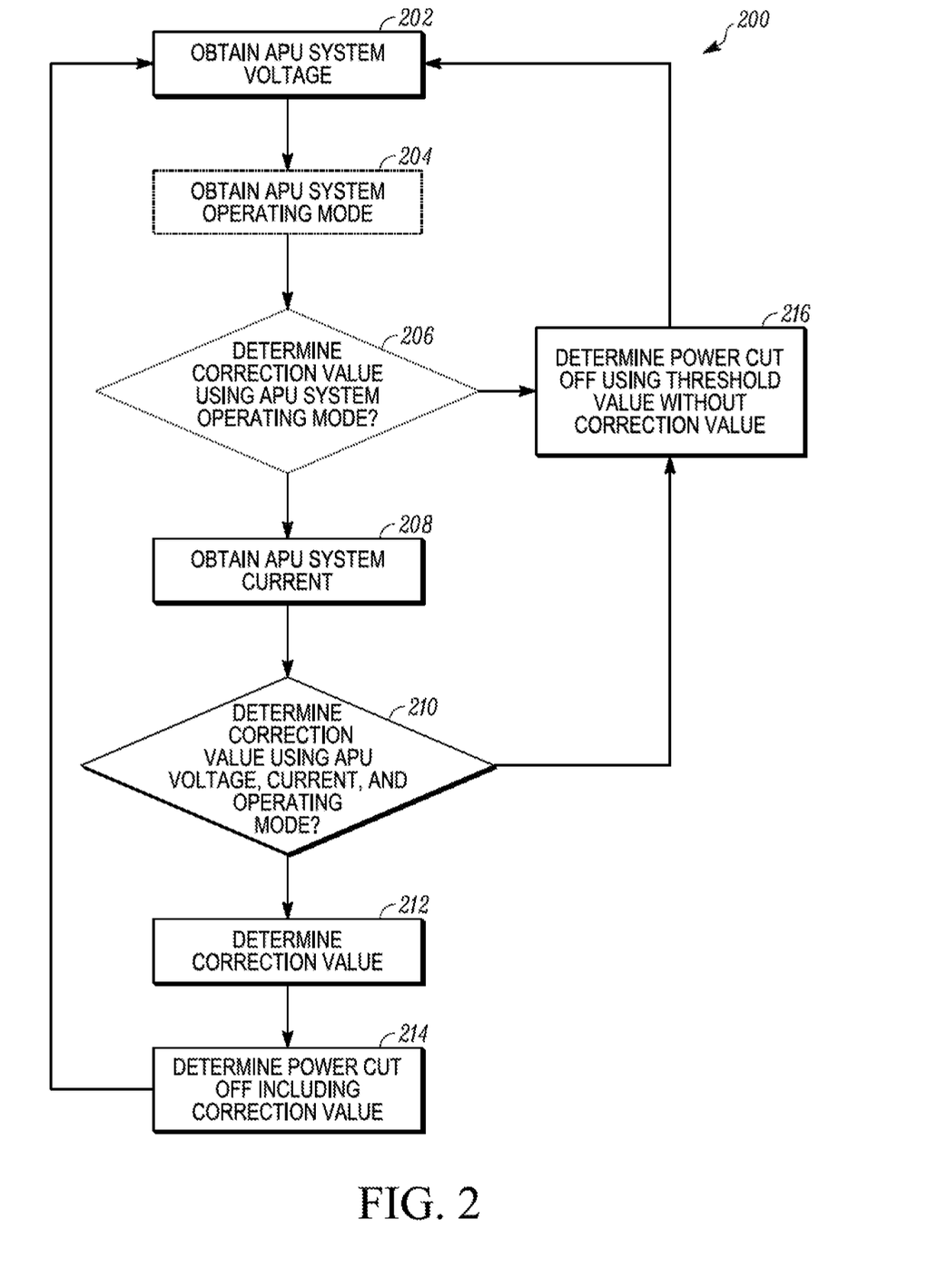
FIG. 2 is a flowchart showing an embodiment of a method for dynamically determining cut off for a battery-powered power unit in an auxiliary power unit (APU) of a tractor.

FIG. 2 is a flowchart of a method embodiment directed to adjusting a cut off threshold for a battery-powered system, where the battery-powered system is an auxiliary power unit (APU) of a tractor powering a heating, ventilation, air conditioning, or refrigeration (HVACR) unit.

Method 200 includes obtaining the APU system voltage 202, obtaining an APU system operating mode 204, and determining whether a correction value is determined 206 based on the APU system operating mode obtained in 204. If the correction value is determined, the method 200 proceeds to measuring APU system current 208 and determines if a correction value is determined at step 210 based on the APU system voltage, the APU system current, and the APU operational mode. Where the correction value is to be determined, the correction value is determined at 212. The correction value determined at 212 is used to determine whether to cut off power based on a threshold and the correction value at 214. If a correction value is not determined based on step 206 or 210, the method proceeds to determining whether to cut off power based on a threshold value with no correction value at 216. If it is determined to cut off the power at either of 214 or 216, the battery-powered power unit of the APU is cut off from providing power to the HVACR unit. If it is determined to not cut off the power at either of 214 or 216, the method 200 returns to step 202 to iterate again. The iterations may be continuous, scheduled, set according to a sampling frequency, triggered by events such as changes in operational modes, etc. The iteration of method 200 provides dynamic determination of whether to cut off the supply of power from the APU.

The APU system voltage is obtained at 202. In an embodiment, the APU system voltage is the voltage across a battery included in the APU. The APU system voltage may be obtained by a voltage sensor measuring the voltage across the battery included in the APU. The APU system voltage is the state of charge parameter of the method shown in FIG. 2.

In the embodiment shown in FIG. 2, an APU system operating mode is obtained at 204. The APU system operating mode is a mode in which a load drawing power from the APU is operating. In an APU including an HVACR unit, the APU system operating mode is a mode of operation for the HVACR unit, such as a COOL mode, a FAN ONLY mode, a HEAT mode or a NULL mode. The mode of the HVACR unit may be associated with the load the HVACR unit places on the battery-powered power unit. The APU system operating mode may be used to determine whether a correction value is required.

Whether the APU system operating mode determines a correction value is determined at 206. In the embodiment shown in FIG. 2, a correction value is determined when the APU system operating mode indicates a high load, for example a COOL or a FAN ONLY mode. Where a correction value is determined, the method proceeds to obtaining an APU system current at 208. This determination is optional, but can streamline operation of the method by avoiding the calculation of an offset value at 212. A correction value is not determined when the APU system is in a low-load mode, for example where the APU system operating mode is a HEAT or a NULL mode. Where a correction value is not determined, whether the battery-powered power unit is to be cut off is determined without using a correction value, at 216.

Where a correction value is not determined, for example where the APU system operating mode does not provide a significant load on the battery-powered power unit, it is determined whether the state of charge of the battery is at or below a target state of charge value at 216. In the determination of 216, the APU system voltage is compared to a threshold value, without determining or applying a correction value. In the embodiment shown in FIG. 2, the threshold value is a voltage value. Where the APU system voltage obtained at 202 exceeds the threshold value, the process returns to step 202 and may iterate once more. Where the APU system voltage obtained at 202 is equal to or less than the threshold value, the power supplied by the battery-powered power unit of the APU is cut off.

Where a correction value is determined, the APU system current is obtained at 208. The APU system current is the current provided by the battery-powered power unit of the APU system. The APU system current is indicative of load on the battery-powered power unit. The APU system current may be obtained from a current sensor located within the APU.

In an embodiment, whether to determine a correction value is determined based on APU system voltage, APU system current and APU system operating mode at 210. Whether to determine a correction value may be determined by, for example, determining whether the APU system current is within a range of values for which a correction value is not required. Whether to determine a correction value may be based on the APU system operating mode, such as the mode of operation for the HVACR unit, such as a COOL mode, a FAN ONLY mode, a HEAT mode or a NULL mode.

A correction value is determined at 212. The correction value may be determined based on the APU system current, and optionally the APU system voltage obtained at 202 and/or the APU system operating mode obtained at 204. The correction value may be determined based on, for example, computing the correction value based on at least the APU system current using a physical model of the battery, a database of correction values based at least in part on the APU system current such as a lookup table of correction values by APU system current, etc.

A determination of whether to cut off the power is made including the correction value at 214. The determination of whether to cut off the power is performed by adjusting at least one of the threshold value and/or the APU system voltage according to the correction value determined at 212, and comparing the threshold value and the APU system voltage after the adjustment. In the embodiment shown in FIG. 2, where, after adjustment, the APU system voltage exceeds the threshold value, the method 200 returns to step 202 to iterate again. In the embodiment shown in FIG. 2, where, after adjustment, the APU system voltage is less than or equal to the threshold value, the power supplied by the battery-powered power unit of the APU is cut off.

Figure 3:
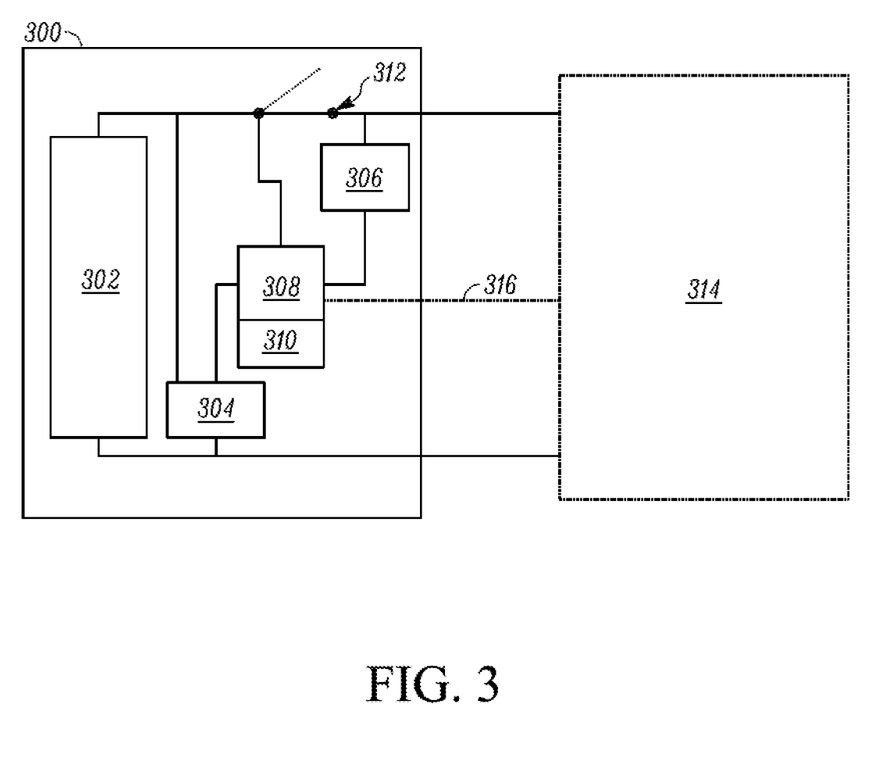
FIG. 3 is a system schematic showing an embodiment of a battery-powered system including a battery-powered power unit with a dynamic cut off.

FIG. 3 shows a system diagram for a battery-powered system including a battery-powered power unit with a dynamic cut off. The battery-powered system includes a battery-powered power unit 300, which is connected to load 314. The battery-powered power unit 300 may supply power to the load 314 through the connection. In an embodiment, the system may include a battery-powered transport refrigeration unit (TRU). In an embodiment, the system may include an auxiliary power unit APU. In an embodiment the APU may power a heating, ventilation, air conditioning and refrigeration (HVACR) unit of a tractor. In an embodiment, the system may include an auxiliary electrical storage system.

Battery-powered power unit 300 provides electrical power to connected load 314. Battery-powered power unit 300 and load 314 form the battery-powered system. The battery-powered power unit 300 automatically cuts off power at or near a target state of charge value, determined based on a state of charge parameter, an adjustment parameter, and a threshold value. The battery-powered power unit 300 includes a battery 302, a state of charge parameter sensor 304, an adjustment parameter sensor 306, a controller 308, a memory 310 and power cut off 312. In an embodiment, controller 308 is connected to load 314 by connection 316, allowing a command to be sent to load 314, for example to deactivate the load 314 based on a determination by controller 308 to cut off power.

Battery 302 may be a rechargeable battery, such as a lead-acid battery, lithium-ion battery, etc. The battery 302 has a finite power storage capability. The power stored in the battery 302 is reflected by the state of charge of the battery 302. The battery may require operation within certain state of charge thresholds to, for example, maintain battery function, or to ensure the battery 302 can supply sufficient power to support a particular function.

State of charge parameter sensor 304 is a sensor that measures a variable correlated with the state of charge of the battery. In the embodiment shown in FIG. 3, state of charge parameter sensor 304 is a voltage sensor. In the embodiment shown in FIG. 3, state of charge parameter sensor measures the voltage across battery 302.

Adjustment parameter sensor 306 is a sensor measuring a variable that impacts the relationship of the state of charge parameter and the state of charge of the battery. In the embodiment shown in FIG. 3, the adjustment parameter sensor 306 is a current sensor located to measure the current flowing out of the battery-powered power unit 300. There may be one or multiple adjustment parameter sensors 306. Adjustment parameter sensor 306 may be, for example, a temperature sensor measuring the temperature of a battery, a temperature sensor measuring an ambient temperature at the battery-powered power unit 300, a humidity sensor, etc.

Controller 308 directs the operation of the battery-powered power unit 300. Controller 308 includes a processor. Controller 308 is connected to state of charge parameter sensor 304 and adjustment parameter sensor 306. Controller 308 obtains a state of charge parameter and an adjustment parameter. Controller 308 determines whether the state of charge of battery 302 is below a target state of charge value, based on the state of charge parameter and the adjustment parameter. Controller 308 may compare the value of the state of charge parameter to a threshold value corresponding to the target state of charge value. Controller 308 may adjust one or more of the state of charge parameter and/or the threshold value by a correction value. Controller 308 may determine whether a correction value is needed based on data from components outside the battery-powered power unit., for example, the load 314. Controller 308 may determine the correction value based on the adjustment parameter. Controller 308 may determine the correction value by computation using a physical mode, reference to a lookup table of correction values, etc. Controller 308 may carry out some or all of the steps of method 100 and/or method 200 described above. Cutting off power supplied by the battery-powered power unit may be based on the determination made by controller 308. Controller 308 is in communication with power cut off 312. Controller 308 may send a signal to power cut off 312 directing that the power be cut off, for example when the controller 308 determines that the state of charge of battery 302 is less than the target state of charge value.

In an embodiment, the state of charge parameter sensor 304 and/or the adjustment parameter sensor 306 may be integrated parts of the controller 308, for example where the controller 308 includes a chip with on-board voltage and/or current measurement sensors. In an embodiment, the state of charge parameter sensor 304 may be a pre-existing sensor included in the battery-powered power unit 300. In an embodiment., the adjustment parameter sensor 306 may be a pre-existing sensor included in the battery-powered power unit 300. In an embodiment, the controller 308 may be an existing controller included in the battery-powered power unit 300.

Controller 308 may include or be coupled to memory 310. Memory 310 may be a non-volatile memory such as a hard disk or flash memory that stores values such as past readings from the adjustment parameter sensor 306. Memory 310 may be used to store battery information, such as the model number, age, or other such data. Memory 310 may be used to store a predefined threshold value. Memory 310 may be used to store a model correlating the state of charge parameter to the actual state of charge of the battery 302, for example based in part on the adjustment parameter. Memory 310 may store a database of correction values, for example a lookup table of correction values for certain values of the adjustment parameter.

Power cut off 312 is used to control whether the battery-powered power unit 300 provides power to some or all of load 314. In the embodiment shown in FIG. 3, power cut off 312 is a switch. Power cut off 312 may only affect power to the load 314 with the controller 308 being powered even when the cut off 312 is activated. In an embodiment, cut off 312 may control the supply of power to a particular load included in load 314. The particular load may be a primary function, for example, an HVACR unit or a transport refrigeration unit. Loads included in load 314 aside from the particular load, for example cabin electronics, etc. may remain powered even when power cut off 312 has cut off power to part of load 314. Cut off 312 may reduce the power supplied by battery-powered power unit 300 to load 314 instead of shutting it off completely. Power cut off 312 may be connected to the controller 308. Power cut off 312 may be operated according to a signal from the controller 308, for example cutting off the power supplied by battery-powered power unit 300 when the controller sends a signal indicating that the state of charge of battery 302 is below a target state of charge value. In an embodiment, there may be connection 316 between the controller 308 and the load 314 in addition to or in place of power cut off 312. Connection 316 may allow controller 308 to provide a signal to load 314 to disable the load or reduce power consumption of the load, for example by setting a state of the load 314 to an off or limited-power state.

Battery-powered power unit 300 is connected to a load 314. Battery-powered power unit 300 may provide power to the load 314. The load 314 may be, for example, a heating, ventilation, air conditioning or refrigeration (HVACR) unit. Load 314 may include multiple power-drawing elements, such as, for example an HVACR unit and also hotel loads for a tractor, such as electronic devices, lights, etc. In an embodiment, load 314 is a transport refrigeration unit. Load 314 may supply data to controller 308, for example an operational state of the load. In an embodiment, load 314 is an HVACR unit, and provides an operational state of the HVACR unit, such as NULL, FAN ONLY, HEAT, or COOL to the controller 308. The controller 308 may, in part, use the operational state provided by load 314 when determining whether the state of charge of battery 302 is at or below a target state of charge value.

Figure 4:
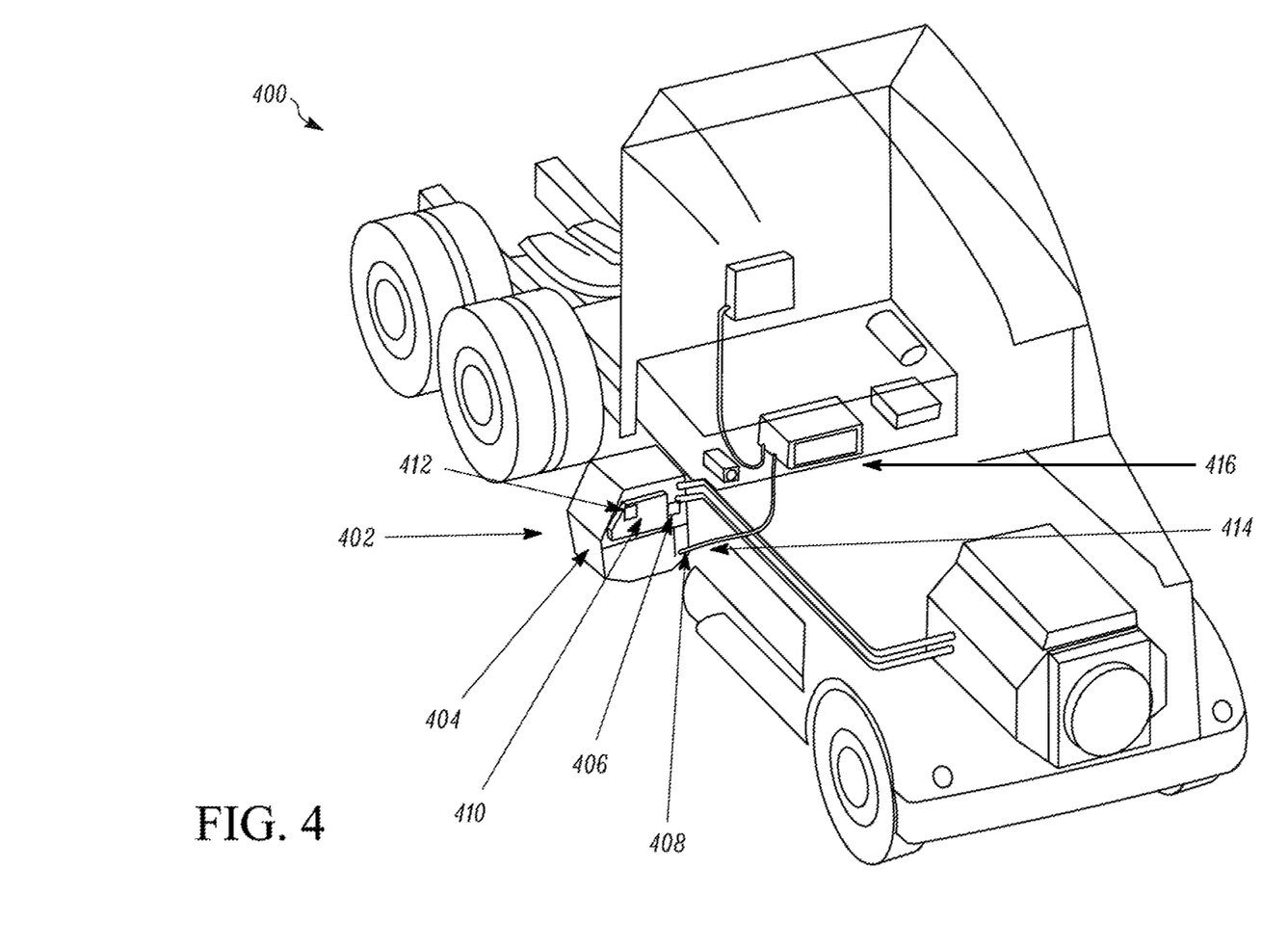
FIG. 4 is a system schematic showing an embodiment of an APU of a tractor including a battery-powered power unit with a dynamic cut off.

FIG. 4 is a system schematic showing an embodiment of a tractor 400 including an APU having a battery-powered power unit with a dynamic cut off. In the embodiment shown in FIG. 4, tractor 400 includes auxiliary power unit (APU) 402 and heating, ventilation, air conditioning and refrigeration (HVACR) unit 416. The embodiment shown in FIG. 4 may be a specific, non-limiting embodiment of the system shown in FIG. 3.

APU 402 is mounted on tractor 400. APU 402 may provide a source of power used by the tractor 400 when a main engine of the tractor 400 is off. APU 402 includes APU battery 404, APU voltage sensor 406, APU current sensor 408, APU controller 410, APU memory 412, and power cut off 414.

APU battery 404 may be a rechargeable battery, such as a lead-acid battery, lithium-ion battery, etc. The APU batter 404 has a finite power storage capability. The power stored in the APU battery 404 is reflected by the state of charge of the APU battery 404. The battery may require operation within certain state of charge thresholds to, for example, improve battery life-time, or to ensure the APU battery 404 can supply sufficient power to support starting a main engine of the tractor 400.

APU voltage sensor 406 is a voltage sensor measuring the APU system voltage, which is the voltage across APU battery 404. APU current sensor 408 is a current sensor measuring the APU system current. Which is the current flowing from the APU 402 to the HVACR unit 416. One or both of APU voltage sensor 406 and APU current sensor 408 may be integral with APU controller 410.

APU controller 410 directs the operation of the APU 402. APU controller 410 includes a processor. APU controller 410 is connected to APU voltage sensor 406 and APU current sensor 408. APU controller 410 obtains the APU system voltage and the APU system current. APU controller 410 determines whether the state of charge of APU battery 404 is at or below a target state of charge value, based on the APU system current and the APU system voltage. APU controller 410 may compare the APU system voltage to a threshold value corresponding to the target state of charge value. APU controller 410 may adjust one or more of the APU system voltage and/or the threshold value by a correction value. APU controller 410 may determine whether a correction value is needed based on data from the HVACR unit 416. APU controller 410 may determine the correction value based on the APU system voltage. APU controller 410 may determine the correction value by computation using a physical mode, reference to a lookup table of correction values, etc. APU controller 410 may carry out some or all of the steps of method 100 and/or method 200 described above. APU controller 410 is in communication with power cut off 414. APU controller 410 may send a signal to power cut off 414 directing that the power provided to HVACR unit 416 be cut off, for example when the APU controller determines that the state of charge of APU battery 404 is less than the target state of charge value.

APU controller 410 may include or be coupled to APU memory 412. APU memory 412 may be a non-volatile memory such as a hard disk or flash memory that stores values such as past readings from the APU current sensor 408. APU memory 412 may be used to information relating to the APU battery 404, such as the model number, age, or other such data. APU memory 412 may be used to store a predefined threshold value. APU memory 412 may be used to store a model correlating the APU system voltage to the actual state of charge of APU battery 404, for example based in part on the APU system current. APU memory 412 may store a database of correction values, for example a lookup table of correction values for certain values of the APU system voltage.

Power cut off 414 controls the flow of power between APU battery 404 and HVACR unit 416. The power cut off 414 is connected to and controlled by APU controller 410, which determines when the power cut off 414 stops the flow of power from APU battery 404 to HVACR unit 416.

HVACR unit 416 conditions the air within the cabin of tractor 400. HVACR unit 416 may be a secondary HVACR unit of tractor 400. HVACR unit 416 may condition the cabin of tractor 400 when the main engine of tractor 400 is shut off. HVACR unit 416 may receive power from APU 402. HVACR unit 416 may communicate an APU system operating mode to the controller 412. The APU system operating mode may be a mode in which the HVACR unit 416 is being operated, for example, a NULL, FAN ONLY, HEAT, or COOL mode. The controller 410 may determine whether or not to apply a correction value when determining whether to cut off power based at least in part on the APU system operating mode received from the HVACR unit 416.

Aspects:

It is to be appreciated that any of aspects 1-9 can be combined with any of aspects 10-14 and/or 15-20. It is to he appreciated that any of aspects 10-14 may be combined with any of aspects 15-20.

Aspect 1: A method for dynamically setting a cut off threshold for a battery-powered power unit, comprising:
obtaining a state of charge parameter correlated with a state of charge of a battery of the battery-powered power unit,
obtaining an adjustment parameter affecting a relationship between the state of charge parameter and the state of charge of the battery of the battery-powered power unit,
determining whether the state of charge of the battery is at or below a target state of charge value, based on the state of charge parameter, the adjustment parameter, and a threshold value, and
when the state of charge of the battery is at or below the target state of charge value, cutting off a supply of power from the battery-powered power unit.

Aspect 2: The method according to claim 1, wherein the state of charge parameter includes voltage across the battery and the adjustment parameter includes current flow out of the power source.

Aspect 3: The method according to any of aspects 1-2, wherein the adjustment parameter includes a temperature of a battery.

Aspect 4: The method according to any of aspects 1-3, further comprising receiving operational state data from a load connected to the battery-powered power unit, and wherein determining the threshold value is further based on the operational state data.

Aspect 5: The method according to aspect 4, wherein the operational state data is an operating mode of an heating, ventilation, air conditioning or refrigeration system.

Aspect 6: The method according to any of aspects 1-5, wherein determining whether the state of charge of the battery is at or below a target state of charge value comprises determining whether an adjustment is needed to the threshold value, and when the adjustment is needed, determining a correction value.

Aspect 7: The method according to aspect 6, Wherein determining a correction value is based on a moving average of values for the adjustment parameter.

Aspect 8: The method according to any of aspects 6-7, wherein determining whether the state of charge of the battery is at or below a target state of charge value further comprises modifying the threshold value according to the correction value and comparing the state of charge parameter to the modified threshold value.

Aspect 9: The method according to any of aspects 6-7, wherein determining whether the state of charge of the battery is at or below a target state of charge value further comprises modifying the state of charge parameter according to the correction value and comparing the modified state of charge parameter to a threshold value.

Aspect 10: A battery-powered power unit, comprising:
a battery;
a state of charge parameter sensor;
an adjustment parameter sensor; and
a controller that:
  obtains a state of charge parameter correlated with a state of charge of a battery of the battery-powered power unit,
  obtains an adjustment parameter affecting a relationship between the state of charge parameter and the state of charge of the battery of the battery-powered power unit,
  determines whether the state of charge of the battery is at or below a target state of charge value, based on the state of charge parameter, the adjustment parameter, and a threshold value, and
  when the state of charge of the battery is at or below the target state of charge value, cuts off a supply of power from the battery-powered power unit.

Aspect 11: The battery-powered power unit according to aspect 10, wherein the state of charge parameter sensor includes a voltage sensor and wherein the adjustment parameter sensor includes a current sensor..

Aspect 12: The battery-powered power unit according to any of aspects 10-11, further comprising a memory configured to store previous readings from the adjustment parameter sensor.

Aspect 13: The battery-powered power unit according to aspect 12, wherein the controller determines whether the state of charge of the battery is at or below a target state of charge value using a moving average of readings from the adjustment parameter sensor.

Aspect 14: The battery-powered power unit according to any of aspects 10-13, wherein the controller determines whether the state of charge of the battery is at or below a target state of charge value by determining a correction value and modifying one of the threshold value or the state of charge parameter according to the correction value.

Aspect 15: A battery-powered system, comprising:
a battery-powered power unit, including:
a battery;
a state of charge parameter sensor;
an adjustment parameter sensor; and
a controller that:
  obtains a state of charge parameter correlated with a state of charge of a battery of the battery-powered power unit,
  obtains an adjustment parameter affecting a relationship between the state of charge parameter and the state of charge of the battery of the battery-powered power unit,
  determines whether the state of charge of the battery is at or below a target state of charge value, based on the state of charge parameter, the adjustment parameter, and a threshold value, and
  when the state of charge of the battery is at or below the target state of charge value, cuts off a supply of power from the battery-powered power unit; and
a load receiving power from the battery-powered power unit.

Aspect 16: The battery-powered system according to aspect 15, wherein the load includes a heating, ventilation, air conditioning or refrigeration unit.

Aspect 17: The battery-powered system according to aspect 16, wherein the controller receives operational state data from the heating, ventilation, air conditioning or refrigeration unit, and the controller determines the threshold value based on the operational state data.

Aspect 18: The battery-powered system according to aspect 15, wherein the load includes a transport refrigeration unit..

Aspect 19: The battery-powered system according to any of aspects 15-18, wherein the state of charge parameter sensor includes a voltage sensor and wherein the adjustment parameter sensor includes a current sensor.

Aspect 20: The battery-powered system according to any of aspects 15-19, wherein the controller determines whether the state of charge of the battery is at or below a target state of charge value by determining a correction value and modifying one of the threshold value or the state of charge parameter according to the correction value.

The examples disclosed in this application are to be considered in all respects as illustrative and not limitative. The scope of the invention is indicated by the appended claims rather than by the foregoing description; and all changes which come within the meaning and range of equivalency of the claims are intended to be embraced therein.

What is claimed is:

1. A method for dynamically determining cut off for a battery-powered power unit, comprising:
   obtaining a state of charge parameter correlated with a state of charge of a battery of the battery-powered power unit;
   obtaining an adjustment parameter affecting a relationship between the obtained state of charge parameter and the state of charge of the battery of the battery-powered power unit;
   determining whether the state of charge of the battery is at or below a target state of charge value, based on the state of charge parameter, the adjustment parameter, and a threshold value corresponding to a value of the state of charge parameter indicative of the target state of charge value, wherein determining whether the state of charge of the battery is at or below a target state of charge value includes
     determining whether an adjustment to the threshold value is needed,
     when the adjustment to the threshold value is needed, determining a correction value, and
     modifying one of the threshold value or the state of charge parameter according to the correction value; and
   when the state of charge of the battery is at or below the target state of charge value, cutting off a supply of power from the battery-powered power unit.

2. The method of claim 1, wherein the state of charge parameter includes voltage and the adjustment parameter includes current flow out of the power source.

3. The method of claim 1, wherein the adjustment parameter includes a temperature of a battery.

4. The method of claim 1, further comprising receiving operational state data from a load connected to the battery-powered power unit, and wherein determining the threshold value is further based on the operational state data.

5. The method of claim 4, wherein the operational state data is an operating mode of a heating, ventilation, air conditioning or refrigeration system.

6. The method of claim 1, wherein determining the correction value is based on a moving average of values for the adjustment parameter.

7. The method of claim 1, wherein determining whether the state of charge of the battery is at or below a target state of charge value further comprises modifying the threshold value according to the correction value and comparing the state of charge parameter to the modified threshold value.

8. The method of claim 1, wherein determining whether the state of charge of the battery is at or below a target state of charge value further comprises modifying the state of charge parameter according to the correction value and comparing the modified state of charge parameter to the threshold value.

9. A battery-powered power unit, comprising:
   a battery;
   a state of charge parameter sensor;
   an adjustment parameter sensor; and
   a controller that:
     obtains a state of charge parameter correlated with a state of charge of a battery of the battery-powered power unit,
     obtains an adjustment parameter affecting a relationship between the obtained state of charge parameter and the state of charge of the battery of the battery-powered power unit,
     determines whether the state of charge of the battery is at or below a target state of charge value, based on the state of charge parameter, the adjustment parameter, and a threshold value corresponding to a value of the state of charge parameter indicative of the target state of charge value, and
     when the state of charge of the battery is at or below the target state of charge value, cuts off a supply of power from the battery-powered power unit,
     wherein the controller determines whether the state of charge of the battery is at or below a target state of charge value by determining a correction value and modifying one of the threshold value or the state of charge parameter according to the correction value.

10. The battery-powered power unit of claim 9, wherein the state of charge parameter sensor includes a voltage sensor and wherein the adjustment parameter sensor includes a current sensor.

11. The battery-powered power unit of claim 9, further comprising a memory configured to store previous readings from the adjustment parameter sensor.

12. The battery-powered power unit of claim 11, wherein the controller determines whether the state of charge of the battery is at or below a target state of charge value using a moving average of readings from the adjustment parameter sensor.

13. A battery-powered system, comprising: a battery-powered power unit, including:
a battery,
a state of charge parameter sensor,
an adjustment parameter sensor, and
a controller that:
obtains a state of charge parameter correlated with a state of charge of a battery of the battery-powered power unit,
obtains an adjustment parameter affecting a relationship between the obtained state of charge parameter and the state of charge of the battery of the battery-powered power unit,
determines whether the state of charge of the battery is at or below a target state of charge value, based on the state of charge parameter, the adjustment parameter, and a threshold value corresponding to a value of the state of charge parameter indicative of the target state of charge value, and
when the state of charge of the battery is at or below the target state of charge value, cuts off a supply of power from the battery-powered power unit,
wherein the controller determines whether the state of charge of the battery is at or below a target state of charge value by determining a correction value and modifying one of the threshold value or the state of charge parameter according to the correction value, and
a load receiving power from the battery-powered power unit.

14. The battery-powered system of claim 13, wherein the load includes a heating, ventilation, air conditioning or refrigeration unit.

15. The battery-powered system of claim 14, wherein the controller receives operational state data from the heating, ventilation, air conditioning or refrigeration unit, and the controller determines the threshold value based on the operational state data.

16. The battery-powered system of claim 13, wherein the load includes a transport refrigeration unit.

17. The battery-powered system of claim 13, wherein the state of charge parameter sensor includes a voltage sensor and wherein the adjustment parameter sensor includes a current sensor.

* * * * *